(12) United States Patent
Zhang et al.

(10) Patent No.: US 11,663,262 B2
(45) Date of Patent: *May 30, 2023

(54) SYSTEM AND METHOD FOR GENERATING A GEOGRAPHIC INFORMATION CARD MAP

(71) Applicant: GOOGLE LLC, Mountain View, CA (US)

(72) Inventors: Guangqiang Zhang, Mountain View, CA (US); Zhou Bailiang, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 16/836,072

(22) Filed: Mar. 31, 2020

(65) Prior Publication Data

US 2020/0226169 A1      Jul. 16, 2020

Related U.S. Application Data

(63) Continuation of application No. 15/193,596, filed on Jun. 27, 2016, now Pat. No. 10,642,883.

(51) Int. Cl.
*G06F 16/29* (2019.01)
*G06F 16/44* (2019.01)
(Continued)

(52) U.S. Cl.
CPC ............ *G06F 16/444* (2019.01); *G06F 3/017* (2013.01); *G06F 3/0482* (2013.01);
(Continued)

(58) Field of Classification Search
CPC ...... G06F 16/444; G06F 16/904; G06F 16/29; G06F 3/017; G06F 3/0482;
(Continued)

(56) References Cited

U.S. PATENT DOCUMENTS 7,283,909 B1    10/2007  Olsen et al.
7,600,192 B1    10/2009  Hashimoto et al.
(Continued)

OTHER PUBLICATIONS

"Grid" dictionary definition from online Google search, 1 page screenshot copy dated May 11, 2021.*
(Continued)

*Primary Examiner* — Dino Kujundzic
*Assistant Examiner* — Jianmei F Duckworth
(74) *Attorney, Agent, or Firm* — Marshall, Gerstein & Borun LLP

(57)     ABSTRACT

To provide synergy between spatial and qualitative information in a single display, a client computing device displays a schematic representation of geographic entities that includes qualitative information about each geographic entity. The geographic entities may be portions of a geographic area which are organized spatially in the schematic. While each geographic entity may have a different size or geometry, the geographic entities are displayed within same sized geographic information cards. The geographic information cards are also traversable by a user through panning from one geographic information card to the next or zooming in and out of different views of the geographic information cards.

20 Claims, 8 Drawing Sheets

(51) Int. Cl.
*G06F 16/904* (2019.01)
*G06F 3/01* (2006.01)
*G06F 3/0482* (2013.01)
*G06F 3/04845* (2022.01)
*G06F 3/0485* (2022.01)
*H04B 1/3827* (2015.01)

(52) U.S. Cl.
CPC ........ *G06F 3/0485* (2013.01); *G06F 3/04845* (2013.01); *G06F 16/29* (2019.01); *G06F 16/904* (2019.01); *H04B 1/3827* (2013.01)

(58) Field of Classification Search
CPC .. G06F 3/04845; G06F 3/0485; G06F 16/909; H04B 1/3827
USPC ........................................................ 715/783
See application file for complete search history.

(56) References Cited

U.S. PATENT DOCUMENTS

| | | |
|---|---|---|
| 2007/0211151 A1 | 9/2007 | Baiping et al. |
| 2009/0210388 A1 | 8/2009 | Elson et al. |
| 2009/0241061 A1* | 9/2009 | Asai ................... G06F 16/29 715/808 |
| 2011/0122153 A1 | 5/2011 | Okamura et al. |
| 2011/0191014 A1 | 8/2011 | Feng et al. |
| 2011/0316884 A1* | 12/2011 | Giambalvo ............ G06F 16/44 345/660 |
| 2013/0042180 A1 | 2/2013 | Sai et al. |
| 2013/0047126 A1 | 2/2013 | Sareen et al. |
| 2013/0063488 A1* | 3/2013 | Gaebler ............. G01C 21/3679 345/636 |
| 2015/0254277 A1* | 9/2015 | Campbell ............... G06F 16/29 715/771 |
| 2016/0033295 A1 | 2/2016 | Li et al. |
| 2016/0054865 A1 | 2/2016 | Kerr et al. |
| 2016/0117348 A1* | 4/2016 | Reynertson ............ G06F 16/29 707/769 |
| 2018/0301111 A1* | 10/2018 | Park ..................... G09B 29/007 |

OTHER PUBLICATIONS

Google Search (2016). Retrieved from the Internet at: https://www.google.com/webhp?sourceid=chrome-instant&ion=1&espv=2&ie=UTF-8#q=seattle%20washington <https://www.google.com/webhp?sourceid=chrome-instant&ion=1&espv=2&ie=UTF-8>.
Google Maps (2016). Retrieved from the Internet at: <https://www.google.com/maps/@41.7920765,-87.5902684,3a,75y,251.93h,90t/data=!3m6!1e1!3m4!1s5V3yoxh4uGd-rV0UbHb9gQ!2e0!7i13312!8i6656>.
International Search Report and Written Opinion for Application No. PCT/US2017/038118, dated Sep. 21, 2017.
Office Action for U.S. Appl. No. 15/193,596, dated Aug. 30, 2018.
Office Action for U.S. Appl. No. 15/193,596, dated Mar. 15, 2019.
Office Action for U.S. Appl. No. 15/193,596, dated Nov. 25, 2019.

* cited by examiner

SYSTEM AND METHOD FOR GENERATING A GEOGRAPHIC INFORMATION CARD MAP

CROSS-REFERENCE TO RELATED APPLICATIONS

This application is a continuation of and claims priority to U.S. application Ser. No. 15/193,596, filed on Jun. 27, 2016, entitled "System and Method for Generating a Geographic Information Card Map," the entire disclosure of which is hereby expressly incorporated by reference herein.

FIELD OF THE DISCLOSURE

The present disclosure relates to displaying geographic data and more particularly, to dividing a geographic area into geographic entities of various shapes and sizes, and for each geographic entity, displaying a schematic representation of the geographic entity.

BACKGROUND

Today, digital maps of geographic areas are displayed on computing devices, such as computers, tablets, and mobile phones via map applications, web browsers, etc. Many map applications display map tiles which are equally sized portions of a geographic area that include map features, such as states, cities, roads, streets, rivers, mountains, etc., and/or map labels. The user may select among several scales for viewing the map. When the user increases the scale, the geographic area may be divided into a larger number of map tiles which display the map features at a higher level of detail.

Additionally, qualitative information for places is commonly displayed on computing devices, such as computers, tablets, and mobile phones via map applications, web browsers, etc. in displays separate from the map view. For example, reviews of points of interest (POIs) or photographs of a POI may be displayed.

SUMMARY

To provide synergy between spatial and qualitative information in a single display, a card map application on a client computing device displays a schematic representation of geographic entities. The schematic representation includes qualitative information about each geographic entity, where the geographic entities are organized spatially. For example, each of the U.S. states may be displayed on an individual geographic information card, which includes such information as photographs of the state, a description of the state, reviews of POIs in the state, a map view of the state, etc. The geographic information cards may be displayed side-by-side, above, and below each other in a grid pattern to define a "card map," where the geographic information card for each state is positioned according to the state's location in relation to the other states. For example, the geographic information card for California may be displayed to the left of the geographic information card for Nevada and below the geographic information card for Oregon on a card map display.

Rather than dividing a geographic area (e.g., the United States) into map tiles which represent equally sized portions of the geographic area, or otherwise generating a digital map that accurately represents distances, sizes, and other geographic properties, the card map application generates the geographic information cards according to political boundaries, population, popularity, information density, etc. In this manner, a user may view portions of the geographic area which are recognizable and likely to be significant to the user. For example, if the information density in portions of Nevada is low, such as locations between Reno and Las Vegas, the card map application may not generate geographic information cards for such locations. As a result, the user does not have to navigate through several geographic information cards between Reno and Las Vegas on the card map display, and also may learn that a big city does not exist between the two locations when planning a trip, for example. Further, the present embodiments advantageously allow users to view spatially organized information along with qualitative information for places. In this manner, users do not have to navigate back and forth between multiple views (e.g., a map view and a review page) when researching a particular place.

In particular, an example embodiment of the techniques of the present disclosure is a method for presenting geographic data on a client computing device. The method includes generating geographic information cards for respective geographic entities, where at least two of the geographic information cards of an equal size correspond to geographic areas of different sizes or geometries. The method further includes generating a representation of a geographic area using the geographic information cards, including placing each geographic information card relative to the rest of the geographic information cards in accordance with relative geographic positioning of the corresponding geographic entities. Moreover, the method includes providing the representation of the geographic area via a user interface of the client computing device, where at least some of the geographic information cards are individually selectable to display additional information related to the corresponding geographic entities.

Another example embodiment is a client computing device for presenting geographic data, where the client computing device includes a user interface, one or more processors coupled to the user interface, and a non-transitory computer-readable memory coupled to the one or more processors and storing thereon instructions. The instructions, when executed by the one or more processors, cause the client computing device to generate geographic information cards for respective geographic entities, where at least two of the geographic information cards of an equal size correspond to geographic areas of different sizes or geometries, and generate a representation of a geographic area using the geographic information cards, including placing each geographic information card relative to the rest of the geographic information cards in accordance with relative geographic positioning of the corresponding geographic entities. The instructions further cause the client computing device to provide the representation of the geographic area via the user interface of the client computing device, where at least some of the geographic information cards are individually selectable to display additional information related to the corresponding geographic entities.

Yet another example embodiment is a server device for presenting geographic data, where the server device includes one or more processors and a non-transitory computer-readable memory coupled to the one or more processors and storing thereon instructions. For each of a plurality of levels of detail, the instructions, when executed by the one or more processors, cause the server device to divide a geographic area into a plurality of regions each representing a different geographic entity, where at each higher level of detail the geographic area is divided into more regions, and where at least two regions at a same level of detail correspond to geographic entities having different sizes or geometries. For each region, the instructions cause the server device to retrieve indications of geographic information data for the region and in response to receiving a request from a client computing device for the geographic information data for a geographic area, the instructions cause the server device to identify one or more regions corresponding to the geographic area. The instructions further cause the client computing device to provide the indications of the geographic information data for the one or more identified regions to the client computing device for displaying geographic information cards for the geographic area.

DETAILED DESCRIPTION

Overview

Figure 1:
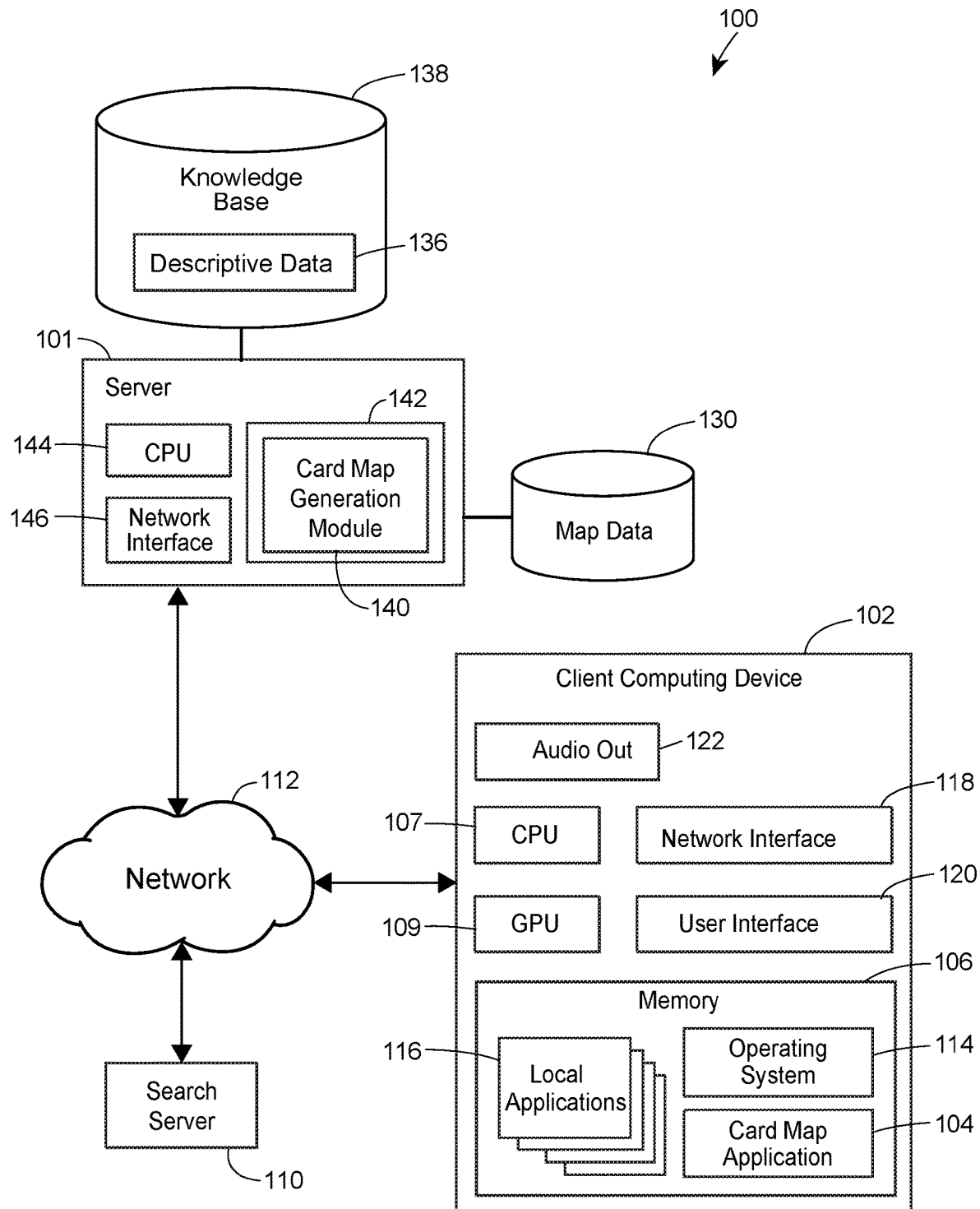
FIG. 1 is a block diagram of an example system in which techniques for providing a card map display to a client computing device can be implemented.

The present embodiments allow a user to view a schematic representation of several geographic entities within a geographic area in a card map display. Each geographic entity may be presented in a geographic information card of the same size and shape on the card map display regardless of the geographic entity's geometry. By relaxing and sometimes removing traditional geometric constraints and displaying geographic entities schematically, the card map display presents geographic information data to a user in proportion to a likely level of importance of the geographic entity.

Moreover, the geographic information cards include qualitative information about the geographic entities in addition to map data. For example, each geographic information card may include the name of the geographic entity, a description of the geographic entity, interactive icons with links to: a map display, reviews of the geographic entity, photographs of the geographic entity, etc. The geographic entities may be arranged on the card map display in a manner that allows the user may navigate from place to place by panning or zooming on the card map display. In this manner, a user can pan to the right to view geographic information cards to the east of the currently viewed geographic information card, can pan to the top to view geographic information cards to the north of the currently viewed geographic information card, etc.

Additionally, the user may be able to zoom in and out to view geographic information cards for geographic areas at higher and lower levels of detail. For example, a user may view a geographic information card of Fremont, a neighborhood in Seattle. The geographic information card may include a description of Fremont and interactive icons with links to view a map of Fremont, and links to restaurants, bars, and shopping in Fremont. The user may zoom out of Fremont and view a geographic information card of Seattle, Wash. This geographic information card may include interactive icons with links to view a map of Seattle, links to restaurants, theaters, and historical landmarks in Seattle, and links to view photographs of Seattle. The user may zoom out once again to view a geographic information card of Washington.

The server device may retrieve the information about a geographic area from a knowledge repository which organizes data or information about geographic entities around semantic principles, such as geographic relationships (e.g., city, country). To generate the geographic information cards, a server device may construct a tree data structure, where descendant nodes correspond to a portion of a geographic area at a higher level of detail as their respective ancestor nodes (e.g., an ancestor node may represent the entire United States while a descendant node may represent the state of Washington). Each node may correspond to a different geographic information card. Moreover, the nodes may not be assigned according to the size of a corresponding geographic area and instead may be assigned based on population, popularity, information density, etc. Several nodes at the same level of detail may correspond to portions of a geographic area having different sizes or geometries (e.g., Washington and California).

For example, while the Pacific Ocean is much larger than the United States, a geographic information card may be generated for the United States, and a single geographic information card may be generated for the Pacific Ocean. When a user pans to the left of the United States card, the user does not have to view several geographic information cards of the Pacific Ocean, with the same or mostly the same information. Instead, when the user pans to the left after viewing the single geographic information card for the Pacific Ocean, a geographic information card for Japan may be displayed, for example.

As used herein, a "geographic information card" may refer to a rectangular display of one or several types of information for a particular geographic entity. The information may be geographic information data including a name of the geographic entity, a description of the geographic entity, POIs located within the geographic entity, reviews of the POIs, photographs of the geographic entity, a map view of the geographic entity, etc. The geographic information card may include indications of the geographic information data, which may be the geographic information data itself (e.g., a photograph of the geographic entity) and/or interactive icons with links to the geographic information data. The geographic information card may not necessarily be rectangular and can be any suitable shape.

EXAMPLE HARDWARE AND SOFTWARE COMPONENTS

Referring to FIG. 1, an example communication system 100 in which the techniques outlined above can be implemented includes a client computing device 102, a server 101, and a search server 110. The client computing device 102 can display geographic information cards in a card map application 104, which is stored in the memory 106 as a set of instructions and executes on one or more processor(s) (CPU) 107 and/or a graphics processing unit (GPU) 109. The card map application 104 in general can display geographic information cards supplied by the server 101 via a network 112, which can be a wired or wireless network including any suitable local or wide area network (e.g., the Internet). For example, the card map application 104 may be a special-purpose application available at an online application store disposed at the server 101 or an application server. A user of the client computing device 102 may retrieve a copy of the card map application 104 from the application server and install the retrieved copy of the card map application 104 on the client computing device 102. In other implementations, the card map application 104 can be a software component, such as a plug-in, that operates in a web browser (e.g., Google Chrome® or Apple's Safari®) or another application.

The memory 106 may be a tangible, non-transitory memory and may include any types of suitable memory modules, including random access memory (RAM), read-only memory (ROM), a hard disk drive, flash memory, or other types of memory. In addition to the card map application 104, the memory stores an operating system (OS) 114 and one or more local application(s) 116 or modules. The operating system 114 may be any type of suitable operating system. The one or more local application(s) 116 may include a variety of installed applications, such as contacts for a user, a weather application, etc. The local applications 116 and the card map application 104 can receive digital content via a network interface 118. A user can interact with the applications 104 and 116 via a user interface 120, which can include a touchscreen, a screen along with speakers 122, a keyboard and a mouse, a microphone, a camera, a global positioning system (GPS) sensor, a WiFi module, etc.

In general, the client computing device 102 can be any suitable portable or non-portable computing device. By way of example, the client computing device 102 may be a smartphone, a tablet computer, a laptop computer, a wearable computing device, etc. In various implementations, the client computing device 102 can include fewer components than illustrated in FIG. 1 or conversely, additional components. In some implementations, for example, the client computing device 102 may include multiple instances of the CPU 107. For clarity, the client computing device 102 may be operated by a user who views geographic information cards on the card map application 104. The server 101 receives and subsequently stores geographic information data for the geographic information cards, and provides the geographic information cards to the client computing device 102 for a user to see.

The server 101, from which the client computing device 102 receives geographic information cards may be communicatively coupled to one or several databases such as a map database 130 storing map data that can include street and road information, topographic data, satellite imagery, information related to public transport routes, information about businesses or other points of interest (POIs), information about current traffic conditions, etc. The map data can be stored in the map database 130 in a vector graphics format, a raster format, or both. In general, the server 101 can receive information about geographically related objects from any number of suitable databases, web services, etc.

It will be understood that although the server is illustrated in FIG. 1 as a single device, in general the server 101 can correspond to multiple servers responsible for respective types of content or respective operations. For example, the server 101 can include a server that stores geographic information cards and another server that searches for geographic information data associated with geographic entities within a geographic area. For example, a search server 110 may search for geographic information data associated with a geographic entity after the server 101 does not identify a localized version of the geographic information data in a database. The search server 110 may search the Internet or any other machine-readable source of information for geographic information data in the public domain which may include photographs of the geographic entity, reviews of POIs within the geographic entity, a description of the geographic entity, etc. The search server 110 may then provide the geographic information data for the geographic entity or links to the geographic information data to the server 101, which in turn may store the geographic information data with the geographic entity in a container.

In addition to the map database 130, the server 101 may be communicatively connected to a knowledge base 138. The knowledge base 138 is a machine-readable repository of data or information about geographic entities (e.g., objects of interest, places) organized around semantic principles. By way of example, semantic principles may include geographic relationships (e.g., city, country). The data or information about entities may include descriptive data 136 (text descriptions, photographs, links to reviews of POIs, links to a map view, etc.) for each associated geographic entity. For example, when the geographic entity is Lynnwood, Wash., the geographic entity may be connected to links to restaurant reviews in Lynnwood, shopping reviews in Lynnwood, photographs of Lynnwood, a description of Lynnwood, etc. Although the knowledge base 138 is shown in FIG. 1 as storing the descriptive data 136, some knowledge bases may be purely organizational databases in which relationships, or connections, between entities are defined, without storing specific digital content related to the entities. An example knowledge base 138 is described in further detail below with reference to FIG. 4.

In the illustrated implementation, the system for generating a card map display includes a card map generation module 140 (also referred to herein as "the module") stored in a server memory 142 and executed by the server CPU 144. The module 140 may generate geographic information cards for a geographic area received from a user based on related information in the knowledge base 138. For example, the user may request to view a card map display for the United States which is received at the server 101. In some embodiments, the server 101 may receive the user's current location based on the global positioning system (GPS) location of the user's computing device. In this case, the requested geographic area for the card map display may be a geographic area surrounding the user's current location. In other embodiments, the user may be prompted to provide a requested geographic area when opening the card map application 104. However, these are merely a few examples in which the module 140 may receive a requested geographic area. A requested geographic area may be received in any suitable manner.

Example Representations of Geographic Areas Using Geographic Information Cards

Figure 2:
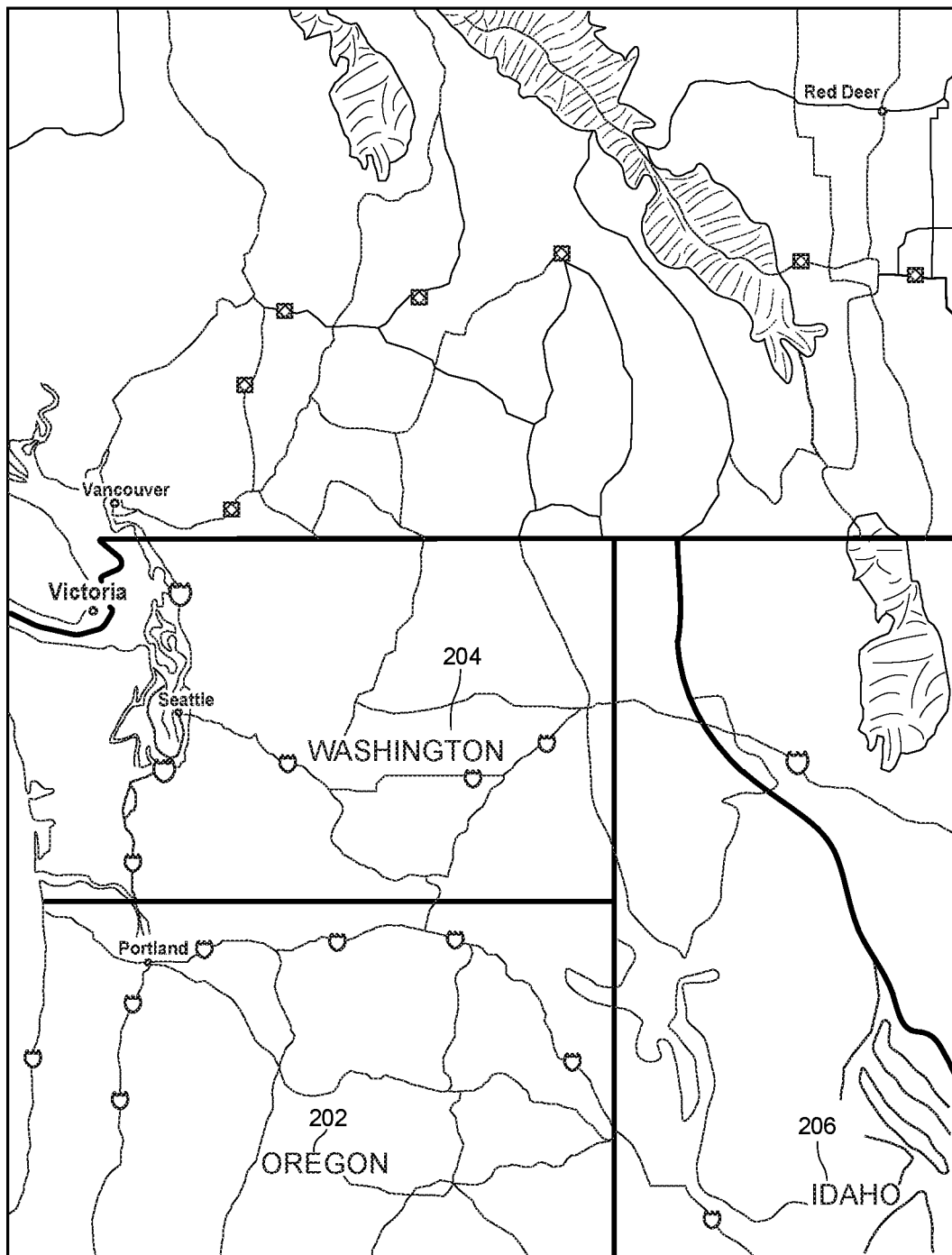
FIG. 2 is an example map view of a geographic area.

FIG. 2 illustrates an example map view 200 of a geographic area in a traditional map display. The geographic area includes a northwest portion of the United States (Washington, Oregon, and Idaho) as well as a southwestern portion of Canada (British Columbia and Alberta). The example map view 200 includes map features such as roads, mountains, bodies of water, etc., as well as map labels such as Oregon 202, Washington 204, and Idaho 206. Each geographic entity (e.g., Washington, Oregon, Idaho, British Columbia, and Alberta) in the map view 200 is displayed according to its size and geometry. For example, the depiction of Washington is rectangular, whereas the depiction of Idaho is irregularly shaped, long and narrow at the top, and wider near the bottom. As shown in FIG. 2, each of these geographic entities have different sizes and geometries.

To generate the card map display, the server 101 as shown in FIG. 1 may convert the map view of a geographic area into a schematic diagram of geographic entities, where each depiction of a geographic entity in the schematic diagram is a same size and shape. For example, the schematic diagram may display each of the geographic entities in equally sized geographic information cards, where the geographic information cards are displayed in a grid pattern. In other embodiments, the geographic information cards may be different sizes but are not displayed according to the size and geometry of the corresponding geographic entities. For example, one geographic information card may be rectangular and twice the size of another rectangular geographic information card. However, neither geographic information card is to scale for its corresponding geographic entity.

The server 101 may identify geographic entities at several levels of detail. For example, at the lowest level of detail a single geographic entity may include the world. At the second level of detail geographic entities may include continents and oceans. At a third level of detail geographic entities may include countries, at a fourth level of detail geographic entities may include states and provinces, at a fifth level of detail geographic entities may include cities, etc.

To convert a map view of a geographic area into a schematic diagram, the server 101 divides the geographic area into segments (also referred to herein as "regions") at each level of detail. The server 101 may divide the geographic area according to political boundaries (e.g., continents, countries, states, cities, etc.) or other criteria such as population, popularity, information density, etc. In some embodiments, the server 101 may divide the geographic area according to political boundaries at some levels of detail and according to population, popularity, information density, etc., at other levels of detail. For example, the server 101 may divide the state of Illinois into cities including Chicago. The server 101 may then subdivide Chicago into neighborhoods based on the population of each neighborhood. Neighborhoods having populations below a population threshold may not be included as geographic segments at the neighborhood level of detail.

Information density may include the amount of geographic information data available for a geographic entity. For example, the information density may be based on the number of photographs, POIs, and reviews of POIs for the corresponding geographic entity. In some embodiments, the card map generation module 140 may rank each of the geographic entities according to their respective information densities or assign a density score to each geographic entity. The geographic entities ranked below a threshold ranking or having density scores below a threshold score may be filtered out and not included on the card map display.

The card map generation module 140 may determine popularity, for example, via travel guides or websites which rank popular travel destinations or via the number of users who view a particular location on a map display. Additionally, popularity may be based on social network commentary, such as the number of likes for the photographs and POIs for the corresponding geographic entity, comments on the photographs and POIs, or a ranking of the POIs provided by the reviews. Popularity may also be determined in any other suitable manner. In some embodiments, the card map generation module 140 may rank each of the geographic entities according to their respective popularities or assign a popularity score to each geographic entity. The geographic entities ranked below a threshold ranking or having popularity scores below a threshold score may be filtered out and not included on the card map display.

Figure 3A:
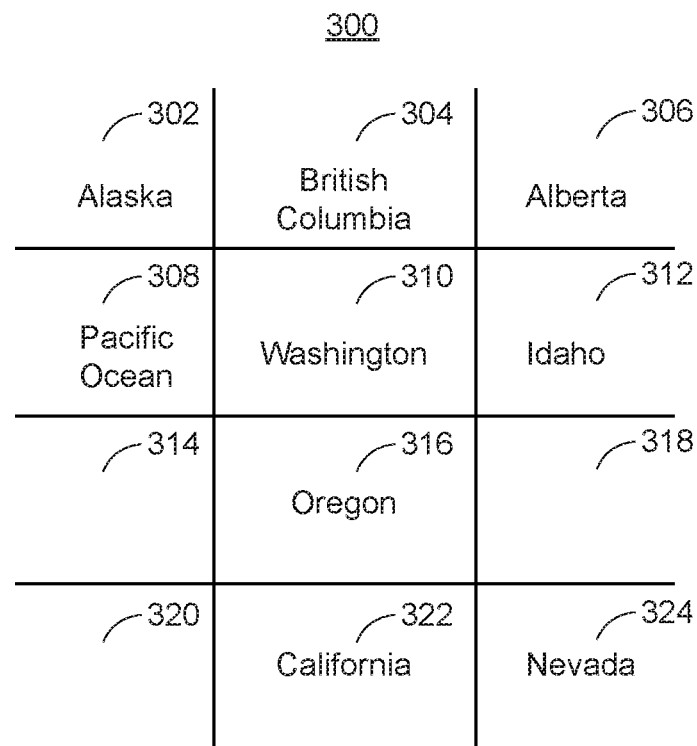
FIG. 3A is an example schematic representation of the geographic area divided at a first level of detail for generating geographic information cards.

FIG. 3A illustrates an exemplary schematic representation 300 of the geographic area in the map view 200 shown in FIG. 2, where the geographic area is segmented at a first level of detail for generating geographic information cards. In the schematic representation 300, the geographic area is divided according to political boundaries. Each geographic segment is presented in a same sized rectangle 302-324 within the schematic representation 300. The schematic representation 300 includes states (Alaska 302, Washington 310, Idaho 312, Oregon 316, California 322, Nevada 324), provinces (British Columbia 304 and Alberta 306), and a body of water (the Pacific Ocean 308). In other embodiments, the geographic segments may be presented in different sized rectangles, where the rectangles do not accurately depict the size and geometry of the corresponding state, province, body of water, etc.

While the Pacific Ocean 308 may be included at lower levels of detail as well, the server 101 may not divide the Pacific Ocean into any further geographic segments or regions. This may be because, for example, the population of various portions of the Pacific Ocean is below a population threshold, the information density for various portions of the Pacific Ocean is below a density threshold, etc. Accordingly, the Pacific Ocean 308 may be included at each higher level of detail when the Pacific Ocean is not divided into geographic segments. For example, the Pacific Ocean 308 may be adjacent to an urban area such as San Francisco, Calif.

However, this is merely one exemplary manner in which a geographic entity may be displayed at a higher level of detail when the geographic entity is no longer subdivided. In other embodiments, the geographic entity may not be included at the higher level of detail, and a user may pan the card map display from Washington directly to a city in Japan without viewing the Pacific Ocean.

Each of the geographic segments are positioned in the schematic representation 300 according to the physical locations of the geographic segments in relation to each other. For example, Washington 310 is adjacent to Idaho 312 on the left in the schematic representation 300 and similarly borders Idaho 312 to the west in the physical world. Moreover, Oregon 316 is adjacent to Washington 310 from below in the schematic representation 300 and similarly borders Washington 310 to the south in the physical world. While each pair of adjacent geographic segments in the schematic representation 300 do not necessarily share borders in the physical world, the geographic segments are positioned to indicate their physical locations with respect to each other.

Additionally, the schematic representation 300 includes several blank spaces 314, 318, 320. To ensure that the geographic segments are positioned according to their physical locations without duplicating geographic segments which are larger than many of the other geographic segments (e.g., the Pacific Ocean, California, etc.), the schematic representation 300 may include blank spaces 314, 318, 320.

The blank spaces 314, 318, 320 may act as placeholders when a user pans in one direction, so that when the user pans from several geographic segments, the same larger geographic segment may be displayed. The blank spaces 314, 318, 320 may also allow the user to skip directly from one geographic segment to the next without viewing several instances of the larger geographic segment. For example, the user may pan to the left when viewing any of Washington 310, Oregon 316, and California 322 to view the Pacific Ocean 308. Additionally, when the user is viewing Alaska 302 and pans down to view the Pacific Ocean 308, the user may only need to pan down one more time to view Hawaii rather than viewing several instances or portions of the Pacific Ocean 308.

In some embodiments, the schematic representation 300 may not include blank spaces and/or the blank spaces may not be visible to the user. The blank spaces are merely included to illustrate the functionality of allowing a user to pan to a same geographic segment from several other geographic segments when panning in one direction and allowing the user to pan to only a single instance of the geographic segment when panning in another direction. In some embodiments, the server 101 may generate a geographic information card for each geographic segment in the schematic representation 300.

Figure 3B:
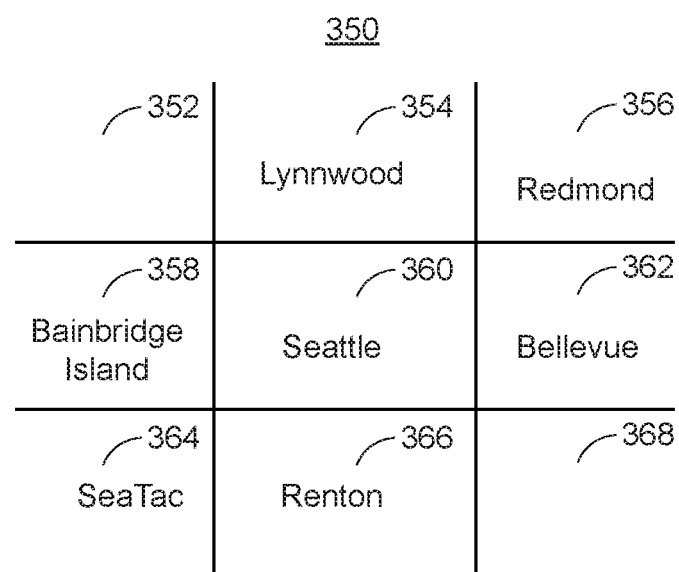
FIG. 3B is an example schematic representation of a portion of the geographic area divided at a second level of detail for generating geographic information cards.

As mentioned above, the geographic area may be segmented at several levels of detail, where the geographic area is divided into more segments at each higher level of detail. FIG. 3B illustrates an exemplary schematic representation 350 of a portion of the geographic area in the map view 200 shown in FIG. 2, where the geographic area is divided at a second level of detail for generating geographic information cards. The schematic representation 350 may include geographic segments or regions for a higher level of detail than the schematic representation 300 as shown in FIG. 3A. For example, the schematic representation 350 may include geographic segments for Washington 310. Similar to the schematic representation 300 as shown in FIG. 3A, the geographic area (Washington) is divided according to political boundaries. Each geographic segment is presented in a same sized rectangle 352-368 within the schematic representation 350. The schematic representation 350 includes several cities (Lynnwood 354, Redmond 356, Bainbridge Island 358, Seattle 360, Bellevue 362, SeaTac 364, Renton 366) and similar to the schematic representation 300, blank spaces 352, 368. Each of the geographic segments are positioned in the schematic representation 350 according to their respective physical locations. In some embodiments, when a user zooms in on Washington in the card map display, the server 101 may generate a geographic information card for each geographic segment in the schematic representation 350.

While the schematic representation 350 includes geographic segments for Washington 310, additional schematic representations which include geographic segments for the other U.S. states may also be included. In some embodiments, the additional schematic representations may not be visible to the user on a card map display, but may become visible when the user pans away from the geographic segments for Washington 310 to other locations. For example, the user may pan to the right to view geographic segments for Idaho 312.

Figure 4:
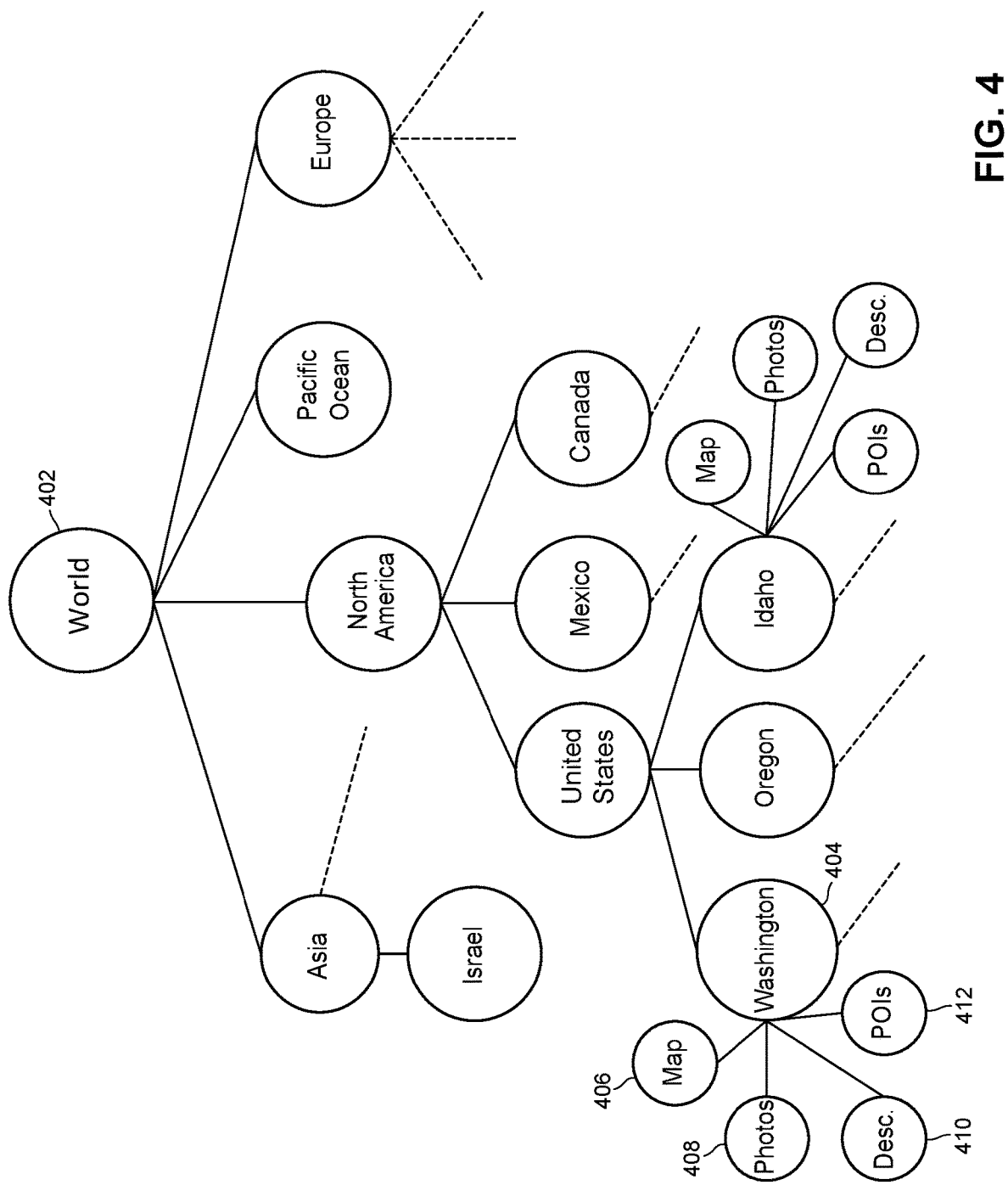
FIG. 4 is a diagram of an example knowledge repository which stores qualitative information for various geographic entities.

In addition to dividing a geographic area into segments, the server 101 obtains geographic information data for each of the geographic entities corresponding to the segments. The geographic information data may be obtained from a knowledge base 138 as shown in FIG. 4. The example knowledge base 138 organizes connections between entities. As mentioned above, the knowledge base may be stored at the server 101 or any other suitable server. In FIG. 4, entities (such as people, places, etc.) are represented by circles and connections between entities are represented by lines connecting the circles. For example, the geographic entity 402 represents the "World." The example geographic entity 402 is connected to other geographic entities based on a common geographic area. For example, the continents "Asia," "North America" and "Europe" and the "Pacific Ocean" are connected to the "World."

Moreover, geographic entities are connected to entities which provide information about the geographic entities (geographic information entities). For example, the knowledge base 138 includes connections between the state of "Washington" 404 and a map view of Washington 406, photographs of Washington 408, a description of Washington 410, and POIs in Washington 412 including reviews of the POIs. In some embodiments, the geographic information entities may provide links to the geographic information data or may include the geographic information data such as the description, photographs, etc.

To build the knowledge base 138, the server 101 may connect geographic entities based on level of detail. The geographic entities may be determined by the server 101 in a similar manner as described above with reference to FIGS. 3A and 3B. For example, the "World" may be divided according to political boundaries into continents and oceans. Each continent may be further divided according to political boundaries into countries and each country may be even further dividing according to political boundaries into states, provinces, or cities. In some scenarios, cities having a population below a population threshold or information density below a density threshold may be filtered out.

Additionally, the server 101 may further divide some cities into neighborhoods, suburbs, towns, etc., when the neighborhoods, suburbs, towns exceed population or density thresholds. Also in some scenarios, neighborhoods may be even further divided into streets for example, when the streets exceed population or density thresholds. For example, the city of Chicago may be divided into several neighborhoods each represented by a geographic entity. One of the neighborhoods, "River North" may be further divided into streets, such as Michigan Avenue, because Michigan Avenue is so well known for shopping and includes several POIs on the one street alone. The server 101 may not include many other streets as geographic entities because the information density and population for other streets do not meet density and population thresholds.

The geographic entities which correspond to leaf nodes of the knowledge base 138 (geographic entities that are not subdivided into any other geographic entities) may be included on the card map display at the level of detail for which they correspond as well as each higher level of detail. For example, if the Pacific Ocean is included at level of detail 1 and is not subdivided any further, a geographic information card for the Pacific Ocean may be included at every level of detail starting at level of detail 1. In other embodiments, when a user zooms to a level of detail which is higher than the level of detail for a leaf node, the geographic entity corresponding to the leaf node may not be included in the card map display.

In addition to dividing a geographic area into smaller and smaller portions of the surface of the geographic area at each additional level of detail, the server 101 may identify geographic entities which are above or below a geographic area or a portion thereof. For example, New York City may include geographic entities for each borough as well as a geographic entity for the New York Subway which is located below the surface of New York City and directly underneath each of the boroughs. This is described in more detail below.

Also to build the knowledge base 138, the server 101 may search for geographic information data corresponding to the geographic entities or may direct the search server 110 in FIG. 1 to search for geographic information data. The search server 110 may search the Internet or any other machine-readable source of information for geographic information data corresponding to the geographic entities. When geographic information data is identified, the card map generation module 140 may store geographic information data or links to the geographic information data in the knowledge base 138 as an entity connected to the corresponding geographic entity.

In some embodiments, the geographic entities may be determined using an iterative process. For example, when a state is divided into several cities the geographic information data for each city may be used to identify population information, a number of POIs within the city, etc. The server 101 may then analyze the identified population information, number of POIs, etc., to determine the population and/or information density for the city which may be compared to population and/or density thresholds. When the city does not exceed one or several thresholds, the server 101 may filter out the city, and as a result the city may not be included as a geographic entity in the knowledge base 138. On the other hand, when the city meets the thresholds, the city may remain as a geographic entity in the knowledge base 138.

While the knowledge base 138 is depicted in FIG. 4 as a tree structure this is merely an exemplary embodiment. The knowledge base 138 may be organized in any suitable data structure, and the entities in the knowledge base 138 may be connected in any suitable manner. Moreover, the entities are not limited to geographic entities and geographic information entities as illustrated in the exemplary embodiment of FIG. 4. The entities may also include people, objects, etc. Additionally, while the knowledge base 138 stores a small number of geographic entities at a few levels of detail, this is for ease of illustration only. The knowledge base 138 may display any number of continents, countries, states, cities, etc., and corresponding geographic information data for each of them.

When the server 101 receives a request for geographic information data for a geographic area, the card map generation module 140 may retrieve the geographic entities and corresponding geographic information entities from the knowledge base 138. In some embodiments, the card map generation module 140 may package the geographic information data for each corresponding geographic entity in a container and transmit the resulting containers to the client computing device 102 for rendering geographic information cards. In other embodiments, the card map generation module 140 may render the geographic information cards.

Additionally, in some embodiments, the card map generation module 140 may transmit instructions to the client computing device 102 for organizing the geographic entities on the card map display. For example, the equally sized geographic information cards may be organized in a grid pattern as shown in the schematic representation 300 of FIG. 3A. Moreover, the geographic information cards may be positioned in accordance with the geographic locations of their corresponding geographic entities. In some embodiments, geographic information cards for geographic entities which share an eastern/western border may be positioned side-by side on the card map display. Geographic information cards for geographic entities which share a northern/southern border may be positioned above and below each other on the card map display. Furthermore, when a geographic entity is below another geographic entity (e.g., the New York Subway and New York City), the corresponding geographic information card for underground geographic entity may be placed behind the geographic information card for the surface level geographic entity on the card map display. In this manner, the geographic information card for the surface level geographic entity may obscure the geographic information card for the underground geographic entity.

Example Card Map Displays

Figure 5A:
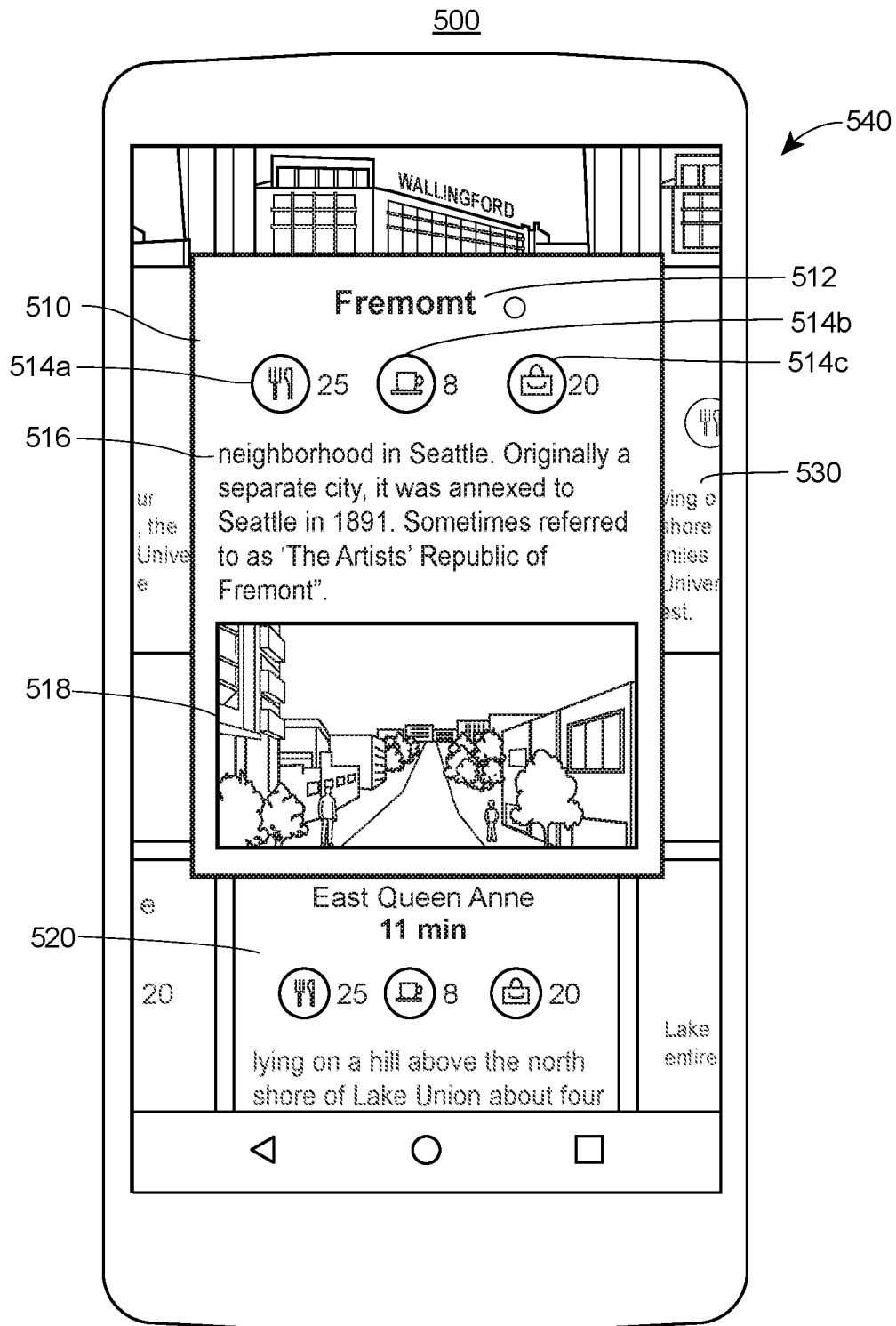
FIG. 5A is a first view of an example card map display including several geographic information cards organized spatially in a grid pattern.

FIG. 5A illustrates a first view 540 of a card map display 500 depicting the city of Seattle at a neighborhood level of detail. In some embodiments, the card map display 500 may be generated by the server 101 and presented on the client computing device 102 via the card map application 104 as shown in FIG. 1. In other embodiments, the server 101 may generate geographic information data for each geographic information card and transmit the geographic information data for each geographic information card (e.g., in a container) to the client computing device 102 for rendering the card map display 500. Additionally, the server 101 may generate geographic information cards or geographic information data for each of the geographic information cards in a batch mode. This may occur offline before geographic information data is requested. Then the batch or a portion of the batch which includes the geographic information cards for a geographic area may be transmitted to the client computing device 102. In some embodiments, the server 101 may periodically update the batch of geographic information cards, for example, when the knowledge base 138 changes. Alternatively, the server 101 may generate the geographic information cards or geographic information data for each geographic information card in real-time, as the client computing device 102 requests geographic information data for a geographic area.

The card map display 500 includes a geographic information card for Fremont 510 (Fremont card) which is a neighborhood in Seattle. The Fremont card 510 includes the name of the geographic entity (Fremont) 512 and several types of geographic information data for Fremont, including a description of Fremont 516 and interactive icons with links to POIs 514*a-c* in Fremont, such as restaurants 514*a*, coffee shops 514*b*, and shopping 514*c*. The Fremont card 510 also includes an interactive icon with a link to a street level map view 518 of Fremont. The interactive icons 514*a-c*, 518 may be thumbnail views of the corresponding geographic information data, symbols representing the corresponding geographic information data (e.g., a knife and fork symbol representing restaurants), or any other suitable icons. When the user selects one of the interactive icons 514*a-c*, 518 for example using a tap gesture if the client computing device 102 includes a touch screen or a mouse click via a mouse, the corresponding map view, POI, etc., may be presented on the client computing device 102. The user may then select a user control on the client computing device 102, such as a "Back" button to return to the card map display 500.

The card map display 500 also includes geographic information cards for several other neighborhoods in Seattle which are adjacent to Fremont. The other neighborhoods may include Phinny Ridge, Ballard, Lower Queen Anne, Green Lake, East Queen Anne, Meridian, Wallingford, and Lake Union. Geographic information cards for each of the neighborhoods may be positioned on the card map display 500 according to their geographic locations in relation to Fremont. For example, the geographic information card for East Queen Anne 520 is displayed below the Fremont card 510, because East Queen Anne borders Fremont to the south. The geographic information card for Wallingford 530 is displayed to the right of the Fremont card 510, because Wallington borders Fremont to the east.

In some embodiments, one of the geographic information cards may be displayed more prominently than the others in an overlay screen on the card map display 500 and may obscure at least a portion of the other geographic information cards. In other embodiments, the prominently displayed geographic information card does not obscure the other cards, but has highlighted or darkened borders. The prominently displayed geographic information card may correspond to a geographic entity that is the center of a requested geographic area and may be presented in the center of the card map display. In another scenario, the user may select the prominently displayed geographic information card, for example by panning or zooming to the geographic information card. As a result, the selected geographic information card may be displayed in an overlay screen obscuring the other geographic information cards.

For example, the Fremont card 510 is displayed in an overlay screen on the card map display 500 and at least partially obscures the other geographic information cards 520, 530. In one exemplary scenario, a user may pan to the Fremont card 510 from one of the other geographic information cards on the card map display 500 or from another geographic information card not included in the card map display 500. As a result, the Fremont card 510 may pop up in front of the other cards on an overlay screen on the card map display 500. In another exemplary scenario, the user may zoom in from Seattle and the Fremont may be located at or near the center of the Seattle.

When the user zooms in, the client computing device 102 or the server 101 may determine which geographic information card to display in an overlay screen in any suitable manner. More specifically, the client computing device 102 may display the geographic information card in an overlay screen which corresponds to the geographic center of the geographic entity from which the user zoomed. As in the example above, when the user zooms in from Seattle, the client computing device 102 may display the geographic information card for Fremont in an overlay screen, because Fremont is the geographic center of Seattle. In another embodiment, the client computing device 102 may display the geographic information card having the highest information density, popularity, population, etc., in the overlay screen. For example, when the user zooms in from Seattle, the client computing device 102 or the server 101 may rank each of the geographic information cards for neighborhoods in Seattle according to information density, popularity, population, etc. The highest ranking geographic information card may be displayed in the overlay screen and the other geographic information cards for neighborhoods in Seattle may be placed on the card map display according to their geographic locations in relation to the highest ranking neighborhood.

In other embodiments, each of the geographic information cards is displayed in the same manner on the card map display 500, where none of the geographic information cards are highlighted or pop out to obscure the other cards. In such embodiments, a user may select one of the geographic information cards, via a tap gesture or a mouse click for example. As a result, the selected geographic information card may be displayed more prominently than the others on the card map display 500.

While the card map display 500 includes nine geographic information cards, this is merely an exemplary embodiment. Any suitable of geographic information cards may be included in a card map display. Additionally, while geographic information cards representing neighborhoods in Seattle are visible to the user on the card map display 500, the card map display 500 may also include geographic information cards for neighborhoods in several other cities, which may be visible in alternative views of the card map display 500. As a result, the user may pan in any suitable direction to view geographic areas north, south, east, and west of the geographic area which is visible in the card map display 500. The user may pan using touch gestures when the client computing device 102 includes a touchscreen, such as a slide or drag gesture or mouse gestures via a mouse, such as a click and drag gesture. The user may also zoom in or out to view the geographic area at various levels of detail (e.g., country, state, city, neighborhood) using pinch and pull gestures or button clicks via a mouse.

In some embodiments, in addition to displaying geographic information cards side-by-side and above and below each other on the card map display, the card map application 104 may display geographic information cards behind other geographic information cards, when a corresponding geographic entity is below the surface for example. In such an embodiment, the geographic information card for a geographic entity below the surface may be completely obscured by a geographic information for a surface level geographic entity. The user may select the geographic information card for the geographic entity below the surface via a three-dimensional (3D) gesture such as a peek gesture. In other embodiments, the user may select the geographic information card in any other suitable manner. Accordingly, the geographic information card for the geographic entity below the surface may be displayed in front of the geographic information card for the surface level geographic entity, in a manner similar to the Fremont card 510. The user may perform another 3D gesture or any other suitable gesture to switch the geographic information cards back to their original positions.

Figure 5B:
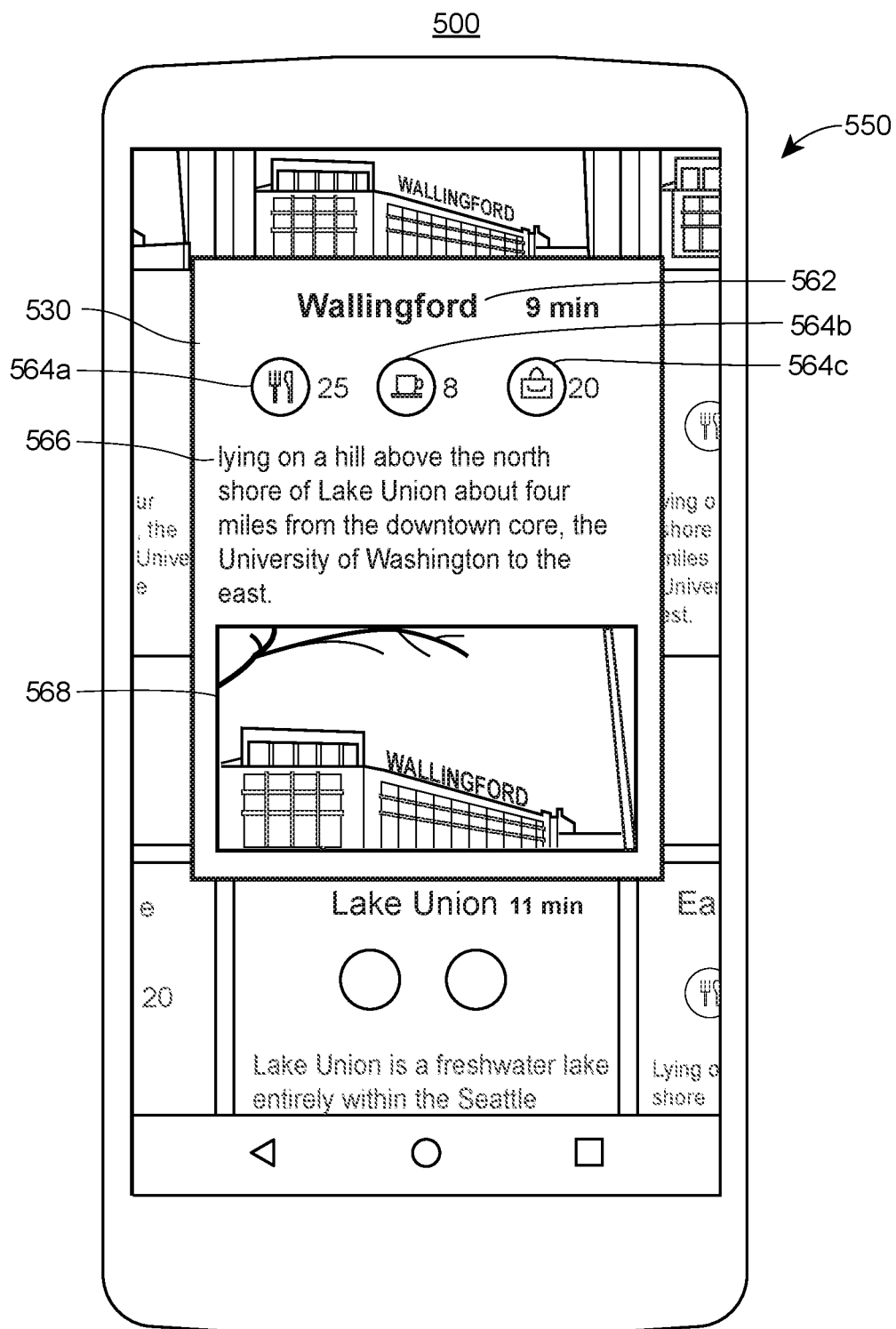
FIG. 5B is a second view of the example card map display after a user pans to the right from the first view as shown in FIG. 5A.

When the user pans to the right on the card map display 500, a second view of the card map display 500 may be presented on the client computing device 102, where the Wallingford card 530 is selected. FIG. 5B illustrates an example second view 550 of the card map display 500. As in the first view 540 of the card map display 500 as shown in FIG. 5A, the selected card (the Wallingford card 530) is displayed in an overlay screen on the card map display 500. Similar to the Fremont card 510 as shown in FIG. 5A, the Wallingford card 530 includes the name of the geographic entity (Wallingford) 562 and several types of geographic information data for Wallingford, including a description of Wallingford 566 and interactive icons with links to POIs 516a-c in Wallingford, such as restaurants 564a, coffee shops 564b, and shopping 564c. The Wallingford card 530 also includes an interactive icon with a link to a street level map view 568 of Wallingford.

The second view 550 also includes other geographic information cards from the first view (Green Lake, East Queen Anne, Meridian, and Lake Union) and geographic information cards for geographic entities east of the first view in response to the user panning to the right. In some embodiments, the server 101 may provide the geographic information cards for the geographic entities east of the first view when the user pans to the right. In other embodiments, card map display 500 may include the geographic entities east of the first view, but they may not be visible on the card map display 500 until the user pans to the right.

Similarly, if the user pans to the left a geographic information card for a geographic entity to the west of the Wallingford card 530 may be selected and geographic information cards for other geographic entities west of the second view 550 may be displayed. Additionally, when a user zooms in or out of a particular view, the server 101 may provide geographic information cards for geographic entities at the new level of detail. Alternatively, the server 101 may provide geographic information cards for geographic entities at several levels of detail, when the client computing device 102 initially requests geographic information data for a geographic area. Then, when the user requests a particular level of detail (e.g., by zooming in or out), the client computing device 102 may present the geographic information cards for the requested level of detail on the card map display 500.

In an exemplary scenario, John is planning a trip to the Pacific Northwest. He may view a card map display including geographic information cards for Washington, Oregon, and British Columbia. Each geographic information card may provide John with links to photographs, POIs and reviews of POIs for the corresponding geographic entity. Accordingly, John may plan his trip through the Pacific Northwest by following the links. He may also plan out an appropriate route for traveling through the Pacific Northwest based on the positions of each of the geographic information cards. For example, the geographic information card for Oregon may be placed below the geographic information card for Washington, which may be placed below the geographic information card for British Columbia. As a result, John may begin his trip in Oregon and travel north to British Columbia, stopping in Washington along the way.

Moreover, John may zoom in on each of the geographic information cards to view additional geographic information cards which represent cities in Washington, for example. John may navigate through the cities in Washington to further identify places to see on his trip. He may also pan up, down, to the right or to the left to view geographic information cards for regions to the north, south, east, and west of the Pacific Northwest in case he wants to extend his trip or for another trip in the future.

Example Methods for Presenting and Generating Geographic Information Cards

Figure 6:
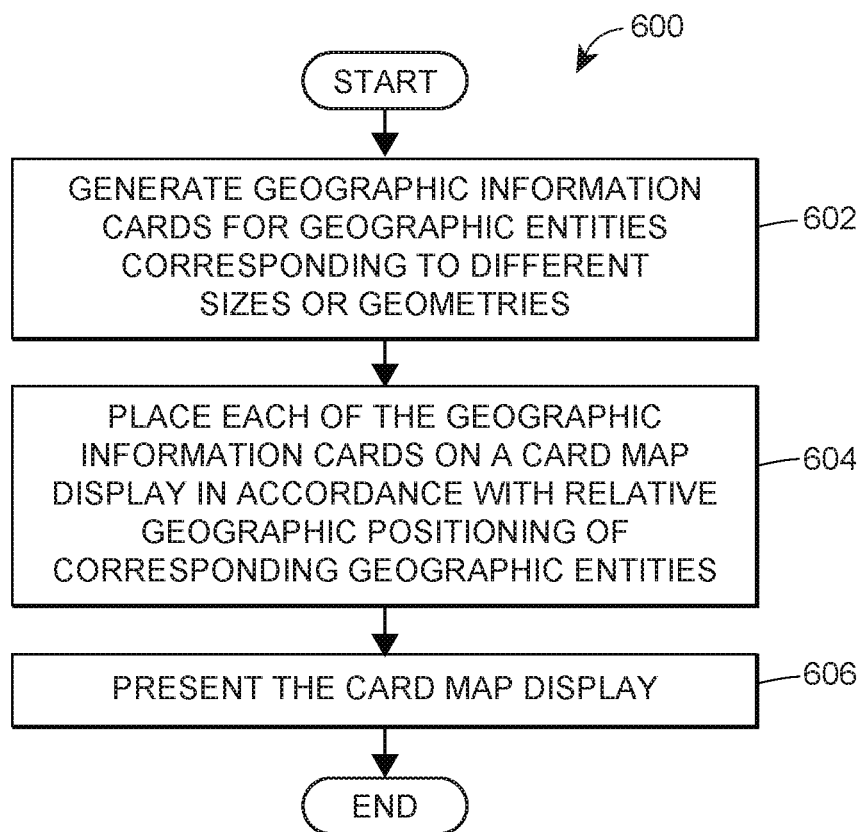
FIG. 6 is a flow diagram of an example method for displaying the card map display, which can be implemented in the client computing device.

FIG. 6 illustrates a flow diagram of an example method 600 for presenting the card map display. The method can be implemented in a set of instructions stored on a computer-readable memory and executable on one or more processors of the client computing device 102. For example, the method can be implemented by the card map application 104.

At block 602, the client computing device 102 may generate equal sized geographic information cards similar to the Fremont card 510 as shown in FIG. 5A, for several geographic entities in a geographic area, where the geographic entities have different sizes or geometries. In other embodiments, the geographic information cards may be different sizes, but are not to scale for the corresponding geographic entities. Each geographic information card may include geographic information data for the corresponding geographic entity. The geographic information data may be arranged in any suitable manner on the geographic information card. For example, a name of the corresponding geographic entity may be displayed at the top followed by a description of the geographic entity and including photographs of the geographic entity or links to photographs just below the description. In another example, each type of geographic information data may be displayed side-by-side on the geographic information card. In some embodiments, as shown in FIG. 5A, the geographic information cards may include interactive icons, which may be individually selectable links to further displays of each corresponding type of geographic information data.

In some embodiments, the client computing device 102 may generate the geographic information cards by transmitting a request to the server 101 for geographic information data for a geographic area. For example, the user may enter a query via the card map application 104 of the client computing device 102 requesting geographic information cards for the United States. In another example, the client computing device 102 may detect the user's current location based on the GPS location of the client computing device 102. The client computing device 102 may then transmit a request for geographic information data for a geographic area surrounding the user's current location (e.g., within a five mile radius of the user's current location). In some embodiments, the client computing device 102 may also transmit a requested level of detail. For example, the requested level of detail may be transmitted in response to the user zooming in and out of the card map display. In another example, the client computing device 102 may transmit a default level of detail (e.g., a city level), or the user may enter the level of detail into the query.

In turn, the server 101 and more specifically, the card map generation module 140 may identify geographic entities within the geographic area at the requested level of detail. For example, the geographic entities may be retrieved from the knowledge base 138. The client computing device 102 may receive geographic information data for each of the identified geographic entities within the geographic area at the requested level of detail. The geographic information data may include a description of the geographic entity and links to photographs of the geographic entity, POIs within the geographic entity, reviews of the POIs, a map view of the geographic entity, etc. In some embodiments, the client computing device 102 may receive a container including all of the geographic information data for a geographic entity. Additionally, the client computing device 102 may receive indications of the locations of each geographic entity for positioning geographic information cards corresponding to the geographic entities on the card map display.

At block 604, the client computing device 102 may generate a representation of the geographic area (a card map display) by placing each of the geographic information cards in accordance with the relative geographic positioning of the corresponding geographic entities. For example, the geographic information cards may be arranged in a grid pattern on the card map display, where geographic information cards at the top of the card map display correspond to geographic entities to the north of geographic entities for the geographic information cards at the bottom of the card map display. Moreover, geographic information cards on the left side of the card map display correspond to geographic entities to the west of geographic entities for geographic information cards on the right side of the card map display. Further, geographic information cards for geographic entities below the surface of a geographic area may be displayed behind the other geographic information cards and may not be visible to the user or may be at least partially obscured.

Then, the client computing device 102 may present the card map display on the user interface 120 (block 606). As mentioned above, the user may pan or zoom in and out of the geographic area displayed on the user interface 120 to view additional geographic areas and/or to view the geographic area at different levels of detail.

Figure 7:
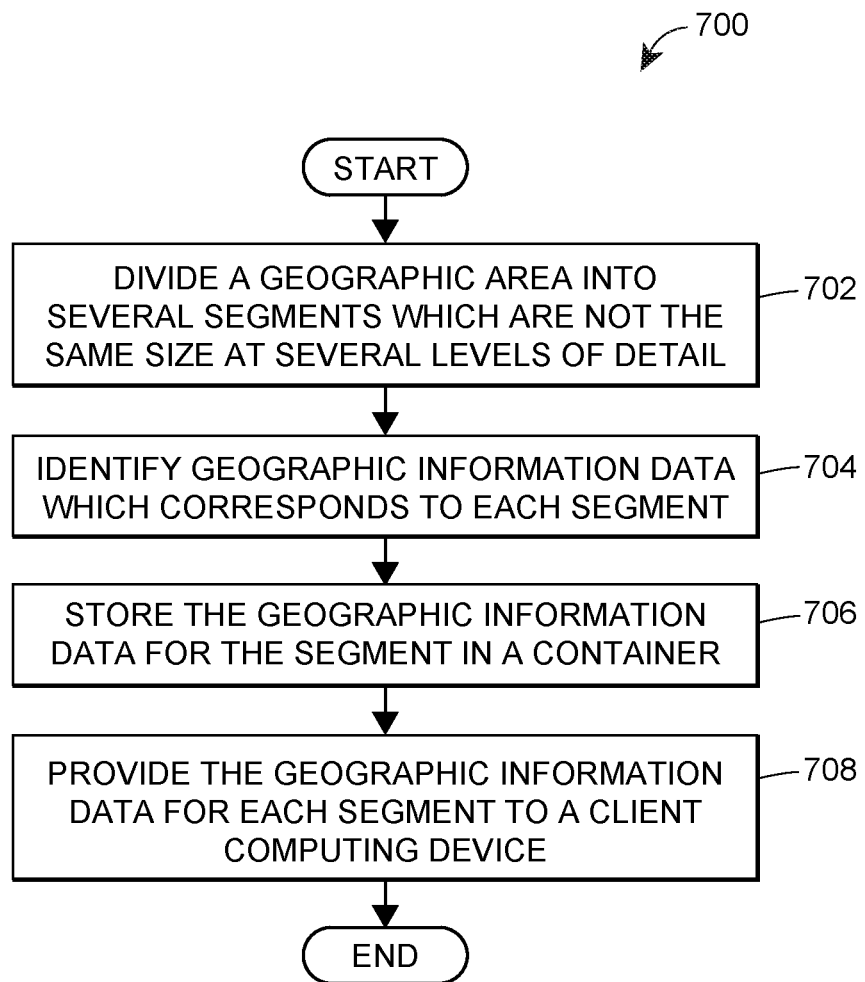
FIG. 7 is a flow diagram of an example method for generating the geographic information cards, which can be implemented in a server device.

FIG. 7 illustrates a flow diagram of an example method 700 for generating the generating the geographic information cards. The method can be implemented in a set of instructions stored on a computer-readable memory and executable on one or more processors of the server 101. For example, the method can be implemented by the card map generation module 140.

At block 702, the server 101 may divide a geographic area into segments or regions at several levels of detail. The server 101 may divide the geographic area according to political boundaries (e.g., continents, countries, states, cities, etc.) or other criteria such as population, popularity, information density, etc. In some embodiments, the server 101 may divide the geographic area according to political boundaries at some levels of detail and according to population, popularity, information density, etc., at other levels of detail. For example, the server 101 may divide the state of Illinois into cities including Chicago. The server 101 may then subdivide Chicago into neighborhoods based on the population of each neighborhood. Neighborhoods having populations below a population threshold may not be included as geographic segments at the neighborhood level of detail. Each of the segments may represent a geographic entity.

Then at block 704, the server 101 may identify geographic information data for each geographic entity. For example, the server 101 may retrieve the geographic information data from geographic information entities connected to the geographic entities in a knowledge base 138. If a geographic entity is not included in the knowledge base 138 or the geographic entity is not connected to geographic information entities, the server 101 may search for geographic information data corresponding to the geographic entities or may direct the search server 110 in FIG. 1 to search for geographic information data. The search server 110 may search the Internet or any other machine-readable source of information for geographic information data corresponding to the geographic entities. When geographic information data is identified, the card map generation module 140 may store geographic information data or links to the geographic information data in the knowledge base 138 as an entity connected to the corresponding geographic entity.

For each geographic entity, the server 101 may package all of the geographic information data for the geographic entity and store the geographic information data in a container (block 706). The server 101 may then provide the resulting containers to the client computing device 102 for generating geographic information cards (block 708). In some embodiments, the server 101 may also transmit indications of the locations of each geographic entity for the client computing device 102 to arrange the corresponding geographic information cards in a card map display. In other embodiments, the server 101 may generate and transmit the geographic information cards to the client computing device 102.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 600 and 700 may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other client computing device, as described herein). The methods 600 and 700 may be included as part of any backend server (e.g., a search server, or any other type of server computing device, as described herein), client computing device modules of the example environment, for example, or as part of a module that is external to such an environment. Though the figures may be described with reference to the other figures for ease of explanation, the methods 600 and 700 can be utilized with other objects and user interfaces. Furthermore, although the explanation above describes steps of the methods 600 and 700 being performed by specific devices (such as a client computing device 102, and a server 101), this is done for illustration purposes only. The blocks of the methods 600 and 700 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for orienting a user within a map display through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for presenting geographic data on a client computing device, the method comprising:
    generating, by one or more processors, geographic information cards for respective geographic entities, wherein each geographic information card does not include a geometry of map features within the geographic entity;
    generating, by the one or more processors, a representation of a geographic area using the geographic information cards, including placing each geographic information card relative to the rest of the geographic information cards in accordance with a relative geographic positioning of each of the geographic entities to the rest of the geographic entities; and
    providing, by the one or more processors, the geographic information cards included in the representation of the geographic area adjacent to each other in a grid-pattern via a user interface of the client computing device, wherein at least some of the geographic information cards are individually selectable to display additional information related to the corresponding geographic entities;
    wherein a same amount of panning is required to traverse two different geographic information cards in the grid-pattern representing geographic regions having different sizes.

2. The method of claim 1, further comprising dividing, by the one or more processors, the geographic area into a plurality of regions based on density of geographic information data available for the region, wherein generating the geographic information cards includes representing each of the plurality of regions by a different geographic information card.

3. The method of claim 2, wherein dividing the geographic area into a plurality of regions includes generating a first geographic information card to represent an urban area of a first size and a second geographic information card to represent a body of water of a second size, wherein the second size is larger than the first size.

4. The method of claim 1, further comprising:
    detecting a selection of one of the geographic information cards via the user interface, and
    generating an overlay screen to display information related to the selected geographic information card.

5. The method of claim 4, wherein a first geographic information card is selected and further including:
    in response to receiving a request from a user to pan the geographic area, generating an overlay screen to display information related to a second geographic information card, wherein the second geographic information card is positioned relative to the first geographic information card in a direction that the user pans.

6. The method of claim 1, wherein generating the geographic information cards includes:
including in each geographic information card, indications of one or more of:
(i) map data for the geographic entity,
(ii) photographs of the geographic entity,
(iii) reviews of the geographic entity,
(iv) points of interest (POIs) at the geographic entity, or
(v) a description of the geographic entity, and
wherein each indication provides a link to a further display of a corresponding type of geographic information data.

7. The method of claim 1, wherein the geographic information cards are displayed for a first level of detail and further including:
in response to receiving a request from a user to adjust a zoom level to a second level of detail on the user interface:
generating, by the one or more processors, geographic information cards for respective geographic entities at the second level of detail; and
generating a representation of the geographic area using the geographic information cards for the geographic area at the second level of detail.

8. The method of claim 1, wherein when a first geographic entity is located below a second geographic entity, a first geographic information card for the first geographic entity is displayed behind a second geographic information card for the second geographic entity on the user interface, wherein the first geographic information card is obscured by the second geographic information card.

9. The method of claim 8, further including:
in response to receiving a three-dimensional (3D) gesture at the second geographic information card indicating a request to view a geographic entity below the second geographic information card, displaying the first geographic information card in front of the second geographic information card on the user interface, wherein the second geographic information card is completely obscured by the first geographic information card.

10. A client computing device for presenting geographic data, the client computing device comprising:
a user interface;
one or more processors coupled to the user interface; and
a non-transitory computer-readable memory coupled to the one or more processors and storing instructions thereon that, when executed by the one or more processors, cause the client computing device to:
generate geographic information cards for respective geographic entities, wherein each geographic information card does not include a geometry of map features within the geographic entity;
generate a representation of a geographic area using the geographic information cards, including placing each geographic information card relative to the rest of the geographic information cards in accordance with a relative geographic positioning of each of the geographic entities to the rest of the geographic entities; and
provide the geographic information cards included in the representation of the geographic area adjacent to each other in a grid-pattern via the user interface of the client computing device, wherein at least some of the geographic information cards are individually selectable to display additional information related to the corresponding geographic entities, and wherein a same amount of panning is required to traverse two different geographic information cards in the grid-pattern representing geographic regions having different sizes.

11. The client computing device of claim 10, wherein the instructions further cause the client computing device to divide the geographic area into a plurality of regions based on density of geographic information data available for the region, wherein generating the geographic information cards includes representing each of the plurality of regions by a different geographic information card.

12. The client computing device of claim 11, wherein to divide the geographic area into a plurality of regions, the instructions cause the client computing device to generate a first geographic information card to represent an urban area of a first size and a second geographic information card to represent a body of water of a second size, wherein the second size is larger than the first size.

13. The client computing device of claim 10, wherein the instructions further cause the client computing device to:
detect a selection of one of the geographic information cards via the user interface, and
generate an overlay screen to display information related to the selected geographic information card.

14. The client computing device of claim 13, wherein a first geographic information card is selected and the instructions further cause the client computing device to:
in response to receiving a request from a user to pan the geographic area, generate an overlay screen to display information related to a second geographic information card, wherein the second geographic information card is positioned relative to the first geographic information card in a direction that the user pans.

15. The client computing device of claim 10, wherein to generate the geographic information cards, the instructions cause the client computing device to:
include in each geographic information card, indications of one or more of:
(i) map data for the geographic entity,
(ii) photographs of the geographic entity,
(iii) reviews of the geographic entity,
(iv) points of interest (POIs) at the geographic entity, or
(v) a description of the geographic entity, and
wherein each indication provides a link to a further display of a corresponding type of geographic information data.

16. The client computing device of claim 10, wherein the geographic information cards are displayed for a first level of detail and the instructions further cause the client computing device to:
in response to receiving a request from a user to adjust a zoom level to a second level of detail on the user interface:
generate geographic information cards for respective geographic entities at the second level of detail; and
generate a representation of the geographic area using the geographic information cards for the geographic area at the second level of detail.

17. The client computing device of claim 10, wherein when a first geographic entity is located below a second geographic entity, a first geographic information card for the first geographic entity is displayed behind a second geographic information card for the second geographic entity on the user interface, wherein the first geographic information card is obscured by the second geographic information card.

18. The client computing device of claim 17, wherein the instructions further cause the client computing device to:

in response to receiving a three-dimensional (3D) gesture at the second geographic information card indicating a request to view a geographic entity below the second geographic information card, display the first geographic information card in front of the second geographic information card on the user interface, wherein the second geographic information card is completely obscured by the first geographic information card.

19. A non-transitory computer-readable memory coupled to one or more processors and storing instructions thereon that, when executed by the one or more processors, cause the one or more processors to:

generate geographic information cards for respective geographic entities, wherein each geographic information card does not include a geometry of map features within the geographic entity;

generate a representation of a geographic area using the geographic information cards, including placing each geographic information card relative to the rest of the geographic information cards in accordance with a relative geographic positioning of each of the geographic entities to the rest of the geographic entities; and provide the geographic information cards included in the representation of the geographic area adjacent to each other in a grid-pattern via the user interface of the client computing device, wherein at least some of the geographic information cards are individually selectable to display additional information related to the corresponding geographic entities, and wherein a same amount of panning is required to traverse two different geographic information cards in the grid-pattern representing geographic regions having different sizes.

20. The non-transitory computer-readable memory of claim 19, wherein the instructions further cause the one or more processors to divide the geographic area into a plurality of regions based on density of geographic information data available for the region, wherein generating the geographic information cards includes representing each of the plurality of regions by a different geographic information card.

* * * * *